(12) United States Patent
Purser et al.

(10) Patent No.: US 7,966,622 B1
(45) Date of Patent: Jun. 21, 2011

(54) INTERFACING A DEVICE DRIVER WITH AN APPLICATION USING A VIRTUAL DRIVER INTERFACE AND A STRATEGY

(75) Inventors: Rob Purser, Wayland, MA (US); David Tarkowski, Framingham, MA (US); Christian Portal, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 459 days.

(21) Appl. No.: 12/015,981

(22) Filed: Jan. 17, 2008

Related U.S. Application Data

(63) Continuation of application No. 11/394,674, filed on Mar. 31, 2006.

(51) Int. Cl.
*G06F 3/00* (2006.01)
*G06F 9/44* (2006.01)
*G06F 9/46* (2006.01)
*G06F 13/00* (2006.01)
*G06F 13/38* (2006.01)

(52) U.S. Cl. .............. 719/321; 710/8; 710/104; 710/62; 710/63

(58) Field of Classification Search ................... 719/321; 710/8, 104, 62–63
See application file for complete search history.

(56) References Cited

U.S. PATENT DOCUMENTS

| | | | |
|---|---|---|---|
| 5,627,998 A | 5/1997 | Mondrik et al. | |
| 5,710,727 A | 1/1998 | Mitchell et al. | |
| 5,717,614 A | 2/1998 | Shah et al. | |
| 5,724,272 A | 3/1998 | Mitchell et al. | |
| 5,771,388 A | 6/1998 | Mondrik et al. | |
| 5,841,955 A | 11/1998 | Wang | |
| 5,963,726 A * | 10/1999 | Rust et al. | 703/13 |
| 6,085,156 A | 7/2000 | Rust et al. | |
| 6,282,586 B1 * | 8/2001 | Bullough | 710/18 |
| 6,405,145 B1 | 6/2002 | Rust et al. | |
| 6,671,749 B2 * | 12/2003 | Williams et al. | 710/10 |
| 6,993,772 B2 | 1/2006 | Pike et al. | |
| 7,165,253 B1 | 1/2007 | Pike et al. | |
| 2005/0198650 A1 * | 9/2005 | Ford et al. | 719/321 |

OTHER PUBLICATIONS

"Instrument Control Toolbox for Use with MATLAB," User's Guide Version 2, The MathWorks, Inc., Mar. 2005, pp. (i) to (xiv), 1-1 to 1-28, 2-1 to 2-8, 3-1 to 3-26, 4-1 to 4-38, 5-1 to 5-38, 6-1 to 6-34, 7-1 to 7-24, 8-1 to 8-16, 9-1 to 9-8, 10-1 to 10-16, 11-1 to 11-12, 12-1 to 12-18, 13-1 to 13-66, 14-1 to 14-28, 15-1 to 15-12, 16-1 to 16-170, 17-1 to 17-134, 18-1 to 18-18, A1 to A2, and Index-1 to Index-16.

* cited by examiner

*Primary Examiner* — Qing Wu
(74) *Attorney, Agent, or Firm* — Cesari and McKenna, LLP; Michael R. Reinemann (57) ABSTRACT

In one embodiment, a test and measurement application executing on a computing device is interfaced with one or more external device coupled to the computing device. A device driver is selected for use with one of the external device from two or more available device drivers that are each compatible with the external device. The device driver is coupled to a virtual driver interface that provides the test and measurement application with a standardized interface to any of the two or more available device drivers. The test and measurement application communicates with the external device through the virtual driver interface.

7 Claims, 8 Drawing Sheets

INTERFACING A DEVICE DRIVER WITH AN APPLICATION USING A VIRTUAL DRIVER INTERFACE AND A STRATEGY

REFERENCE TO RELATED APPLICATIONS

This application is a continuation of copending U.S. patent application Ser. No. 11/394,674, which was filed on Mar. 31, 2006, by Rob Purser et al., entitled, INTERFACING A DEVICE DRIVER WITH AN APPLICATION USING A VIRTUAL DRIVER INTERFACE AND A STRATEGY.

FIELD OF THE INVENTION

The present invention generally relates to interfacing a device driver with an application using a virtual driver interface and a strategy.

BACKGROUND

Device drivers enable communication between an application on a computing device and devices connected to the computing device. Device drivers use driver interfaces to provide a standard interface between an application and the device driver that allows the application to interact with a device. Often several device drivers support a single device or a class of devices. This may be because of technology changes, product obsolescence, behavior differences, or specialization. Conventionally, a user of a computer system must determine which device driver to use for interfacing an application with a device.

Determining the appropriate device driver to use for interfacing an application with a device can be difficult. Many times the user's knowledge of device drivers is inadequate to select the most appropriate device driver for an application or a selected device. As a result, the user does not know if the most appropriate device driver has been selected for a particular device.

SUMMARY OF THE INVENTION

To address the above identified issue, embodiments of the present invention determine the appropriate device driver to use so that the user is not burdened with the responsibility of selecting the appropriate device driver. To accomplish this, a virtual driver interface is provided. The virtual driver interface determines, based on a strategy, which of the device drivers to use for an application to interact with a device.

In one aspect of the present invention, a method of interfacing with a device driver is disclosed. The method includes the steps of providing device drivers for use with devices, and providing a virtual driver interface for interfacing an application with one or more of the device drivers for a device. The method further provides the step of determining with the virtual driver interface which of the device drivers to use for the application to interact with the device based on a first strategy.

In a further aspect of the present invention, a system of interfacing with a device driver is disclosed. The system includes device drivers for use with devices, and a virtual driver interface for interfacing an application with one or more of the device drivers for a device. The system further provides a first strategy for determining with the virtual driver interface which one of the device drivers to use for the application to interact with the device.

In another aspect of the present invention, a method for interfacing with a device driver in an application for a test and measurement environment is disclosed. The method includes the steps of providing device drivers for use with a device and providing a virtual driver interface for interfacing a test and measurement application with one or more of the device drivers for a device. The method further provides the step of determining with the virtual driver interface which one of the device drivers to use for the test and measurement application to interact with the device based on a first strategy.

In yet another aspect of the present invention, a system of interfacing with a device driver is disclosed. The system includes device drivers for use with devices, and a virtual driver interface for interfacing a test and measurement application with one or more of the device drivers for a device. The system further provides a first strategy for determining with the virtual driver interface which of the device drivers to use for the application to interact with the device.

In still another aspect of the present invention, another method of interfacing with a device driver is disclosed. The method includes the step of providing a plurality of device drivers, where each device driver has a driver interface. The method also provides the steps of providing one or more virtual driver interfaces, where each virtual driver interface comprises of at least one of the plurality of driver interfaces, and providing a virtual, composite driver interface comprising of at least one of the virtual driver interfaces. The method further provides the steps of determining with the virtual, composite driver interface which one of the device drivers to use for an application to interact with a device based on a first strategy, and interfacing the application with one or more of the device drivers based on the determination of the virtual, composite driver interface.

In an additional aspect of the present invention, a medium that holds instructions that are executable using a computing device to interface with a device driver is disclosed. The instructions enable the steps of providing device drivers for use with devices, and providing a virtual driver interface for interfacing an application with one or more of the device drivers for a device. The method also provides the step of determining with the virtual driver interface which of the device drivers to use for the application to interact with the device based on a first strategy.

BRIEF DESCRIPTION OF THE DRAWINGS

The invention is described with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention relieves a user from having to determine an appropriate device driver to use for an application or a selected device. To achieve this, the illustrative embodiment provides a virtual driver interface that determines which of device drivers to use for an application to interact with a device based on a strategy. The illustrative embodiment provides the ability to develop a hierarchy with the virtual driver interfaces such that a virtual, composite driver interface may include multiple virtual driver interfaces. The strategy may be anything that would allow the virtual driver interface to determine which of the device drivers to use to enable a selected application to interact with the device. A strategy, for example, may be based on a priority list, a look-up table, a date that the driver was created, a selected application program interface (API), a selected version of the device driver, a selected configuration of devices interfaced with the computing device. As a result, the illustrative invention determines and selects the appropriate device driver to use for a selected application and device, not the user.

An application may be, but is not limited to a test and measurement application. Test and measurement applications may provide, but are not limited to the ability to test system functions, monitor system behavior, measure characteristics of system. One example of a test and measurement application and a test and measurement environment is the DATA ACQUISITION TOOLBOX (DAT) and MATLAB from The Mathworks, Inc of Natick, Mass. The DAT and MATLAB provide a complete set of tools for analog input, analog output, and digital I/O from a variety of PC-compatible data acquisition hardware. The DAT lets a user configure your external hardware devices, read data into MATLAB for immediate analysis, and send out data. In this manner, MATLAB and the DAT offer a single, integrated environment to support the entire data acquisition and analysis process. A user may analyze or visualize data, save it for post-processing, and make iterative updates to a test setup based on analysis results.

Figure 1:
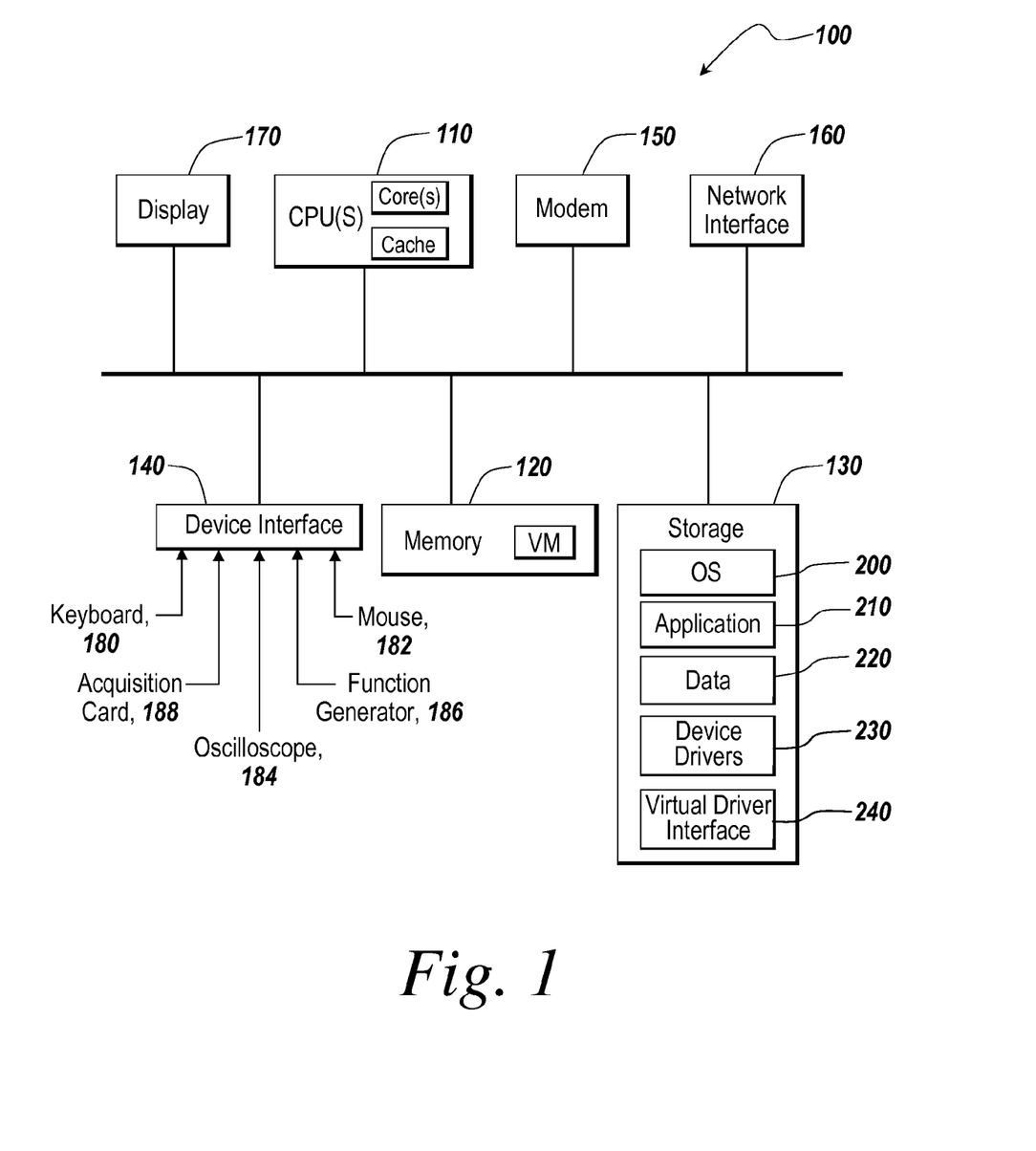
FIG. 1 is an exemplary block diagram of a computing device suitable for practicing the illustrative embodiment.

FIG. 1 is an exemplary computing device 100 suitable for practicing the illustrative embodiment of the present invention. One of ordinary skill in the art will appreciate that the computing device 100 is intended to be illustrative and not limiting of the present invention. The computing device 100 may take many forms, including but not limited to a personal computer, a workstation, server, network computer, quantum computer, optical computer, bio-computer, Internet appliance, mobile device, a pager, a tablet computer, and the like.

The computing device 100 may be an electronic device or an optical device and include a Central Processing Unit (CPU) 110, memory 120, storage 130, a device interface 140, a modem 150, a network interface 160, a display 170, etc. The storage 130 usually contains software for applications and device drivers. The storage 130 includes, in particular, code 200 for the operating system (OS) of the computing device 100, code 210 for applications running on the operating system and code for the device drivers 230. According to the illustrative embodiment the storage also may contain a virtual driver interface and in particular, code for the virtual driver interface 240. Those of ordinary skill in the art will appreciate that the applications can be stored in the memory 120, CPU cache or other computer readable memory as well, much like the data, the virtual driver interface, device drivers and even the OS, or they can be stored on the network described below with reference to FIG. 2. The memory 120 temporarily stores instructions and data and provides them to the CPU 110 so that the CPU 110 operates the computing device 100 to run the applications.

Optionally, the computing device 100 may include multiple CPUs for executing software loaded in the memory 120, and other programs for controlling system hardware. Each of the CPUs can be a single or multiple core processor. The code loaded in the memory 120 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC). Further, part of the application may be run with analog electronic devices.

The device interface 140 may interface with a keyboard 180, a mouse 182, an oscilloscope 184, a function generator 186, a data acquisition card 188 and other devices. It will be recognized by one skilled in the art that the above devices are examples of devices that could be connected to the computing device and are not meant to limit the devices that can be connected to the computing device. Users connect the computing device to the device through various interface options depending upon the device interface implemented by the particular device. Interface options include, but are not limited to, serial, PCI, USB (Universal Serial Bus), ISA, general purpose interface bus (GPIB), virtual machine environment extended for instrumentation (VXI), VXI-GPIB, and IEEE 1394 and 1451.

To enable communication between an application on the computing device and the connected devices device drivers are used. A device driver includes a library of executable functions that an application may call to establish communication with the device and control the parameters of communication. A device driver may be considered a dynamic link library (DLL) or some other type of shared library. Shared libraries, such as DLLs may be used by several applications simultaneously. Shared libraries may include functions and/or data that applications can use and reduce the need for repetitive code by having a single code that multiple applications can use. In some instances, an application does not interface directly with a device driver, but rather interfaces with a driver interface that provides the application with a standard interface that allows the application to interface with the device driver to communicate with the device. In the illustrative embodiment of the present invention the device drivers and/or driver interfaces are virtually grouped by the virtual driver interface to provide a single interface to the application that allows the application to use the device driver to interact with the device.

Figure 2:
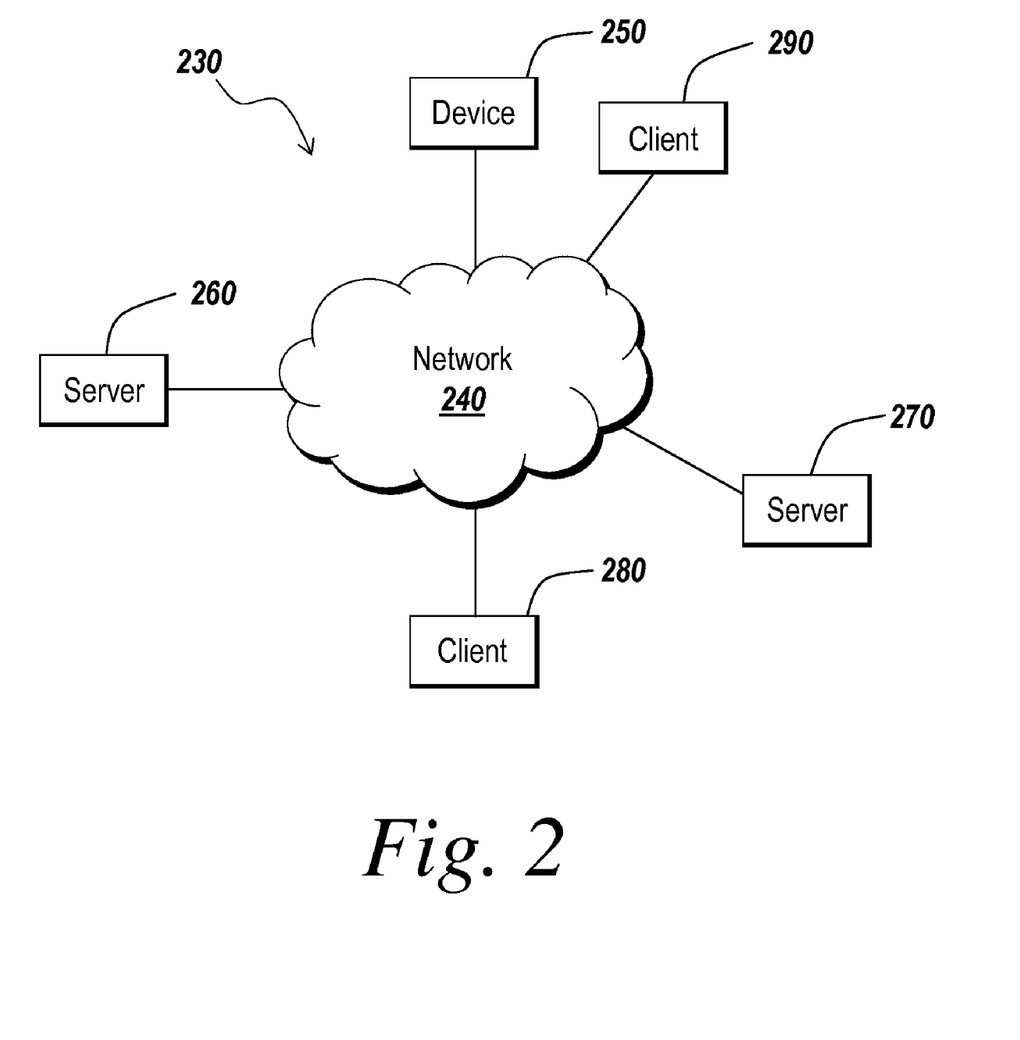
FIG. 2 is an exemplary network environment for a distributed implementation of the present invention.

FIG. 2 is an exemplary network environment 230 suitable for the distributed implementation of the illustrative embodiment. The network environment 230 may include one or more servers 260 and 270, clients 280 and 290 and a networked device 250 each coupled via a communication network 240. The network interface 160 and the modem 150 of the computing device 100 enable the servers 260 and 270 to communicate with the clients 280 and 290 through the communication network 240. The communication network 240 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention. In addition the network may use middleware such as CORBA or DCOM to allow a computer on the network to communicate directly with a component located on another computer that is connected to the network.

In the network environment 230, the servers 260 and 270 may provide the clients 280 and 290 with software applications and or device drivers. Servers 260 and 270 may provide the applications and or device drivers to the clients 280 and 290 under a particular condition, such as a license agreement.

Client 280 may, for example, run an application locally and server 260 may provide a virtual driver interface and a strategy remotely. For example, when client 280 runs the application, client 280 connects to server 260 to use the virtual driver interface provided by server 260 to determine which of the device drivers on client 280 should be used to interface the application with a device connected, locally or remotely, to the client 280. The virtual driver interface provides a single interface for all of the drivers associated with the virtual driver interface and allows the application to communicate with the device.

In another example, client 280 may run an application remotely on client 290, server 260 or server 270 and the application may interact with devices connected to client 280, locally or remotely. For this example, client 280 runs an application remotely on client 290. The virtual driver interface and strategy are located locally on client 280. Client 290 accesses the virtual driver interface located on client 280 to determine which device drivers to use to interface the remote application with the devices connected, locally or remotely, to client 280. Conversely, the virtual driver interface and the strategy may be included in the application. Client 280 may also run an application either locally or remotely, where the application interacts with the networked device 250 according to a device driver as determined by the virtual driver interface.

The examples of the various implementations using a distributed system are not meant to be limiting, but rather, are provided to illustrative a few of the possible implementations according to the present invention. One of ordinary skill in the art will recognize there are other possible implementations using a distributed system in accordance with the present invention.

Figure 3A:
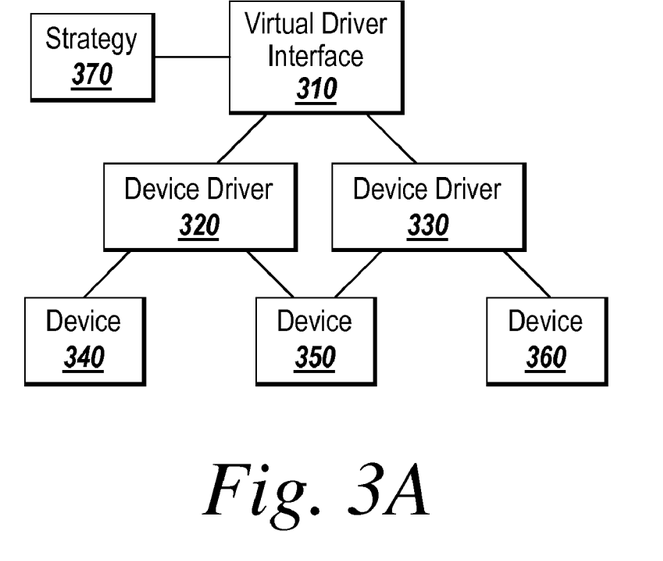
FIG. 3A is a graphical representation of a the hierarchy of the illustrative embodiment.

FIG. 3A is a graphical representation that depicts one aspect of the present invention. In FIG. 3A there are devices 340, 350 and 360, device drivers 320 and 330, virtual driver interface 310 and strategy 370.

Devices 340, 350 and 360 represent devices that are connected to the computing device. The devices may be any device that can be connected to a computer device that requires a device driver. For example, some devices that may be connected to the computing device include, but are not limited to a keyboard, a mouse, an oscilloscope, a function generator and a data acquisition card.

Device drivers 320 and 330 allow an application being run by the computing device to communicate with a device connected to the computing device. Device drivers typically use machine language to perform the functions requested by an application. An application typically cannot communicate with a device directly because each device uses specific machine code for controlling the device. The device driver therefore functions to translate function calls from the application into device specific calls to allow the application to communicate with the device.

Virtual driver interface 310 groups device drivers according to some aspect of the device driver and provides an application with a single interface for all of the device drivers grouped by the virtual driver interface. Virtual driver interface 310 may virtually group device drivers in any manner. Some examples of groups include but are not limited to a grouping by vendor, by type of device, or by class of device. A vendor may be anyone who provides devices and or device drivers. Types of devices may be, but are not limited to pointing devices, printing devices or oscilloscopes. Classes of devices may include but are limited to instrumentation devices, imaging devices, or audio devices.

The lines connecting the items in FIG. 3A do not represent physical connections and are merely shown to provide a sense of hierarchy. For example, the line connecting device 350 to device driver 320 and the line connecting device 350 to device driver 330 associate device 350 with device drivers 320 and 330, such that device drivers 320 and 330 both may be used by an application to communicate with device 350. To provide further hierarchy the lines connecting device drivers 320 and 330 to the virtual driver interface 310 associate device drivers 320 and 330 with the virtual driver interface 310, such that device drivers 320 and 330 belong to the group that virtual driver interface 310 has designated.

Device 350 is capable of being driven by either device driver 320 or device driver 330, therefore, it is necessary to choose one of the device drivers to use to allow the application to interact with the device 350. The virtual driver interface 310 uses strategy 370 to determine which of the device drivers 320 or 330 to use with the device 350. Strategy 370 may be anything that would allow the virtual driver interface to determine which one of the device drivers to use to allow a selected application to interact with the device. Examples of strategies include, but are not limited to a priority list, a look-up table, a date that the driver was created, a selected application program interface (API), a selected version of the device driver, a selected configuration of devices interfaced with the computing device.

Figure 3B:
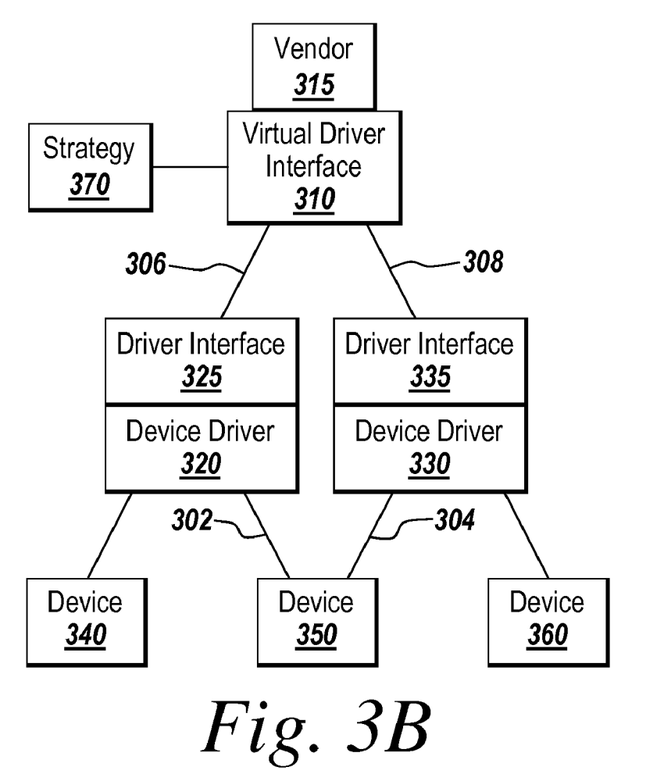
FIG. 3B is another graphical representation of a hierarchy consistent with the illustrative embodiment.

FIG. 3B depicts another aspect of the illustrative embodiment of the present invention. In FIG. 3B there are devices 340, 350 and 360, device drivers 320 and 330, driver interfaces 325 and 335, virtual driver interface 310 and strategy 370. Device drivers 320 and 330 correspond to driver interfaces 325 and 335, respectively. Since device drivers use device specific machine code it may be necessary to provide an application with an interface to the device drivers. Driver interfaces provide the application with a standard interface to allow an application to use a device driver to communicate with a device. The virtual driver interface 310 interfaces with driver interfaces 325 and 335. According to the illustrative embodiment of the present invention, the virtual driver interface 310 provides a single interface to an application that allows the application to use a device driver to interact with a device.

For purposes of FIG. 3B the virtual driver interface is grouped by vendor, such that all device drivers corresponding to vendor 315 are associated with the virtual driver interface 310. The lines connecting the items in FIG. 3B do not represent physical connections and are merely shown to provide a sense of hierarchy. Lines 306 and 308, for example, indicate that device drivers 320 and 330 and respective driver interfaces 325 and 335 are associated with the virtual driver interface. In the present example, lines 302 and 304 indicate that device 350 is associated with two device drivers 320 and 330 from vendor 315, such that device 350 is capable of being driven by either device driver 320 or device driver 330. The virtual driver interface 310 uses strategy 370 to determine which of the device drivers to use with the device 350.

Figure 3C:
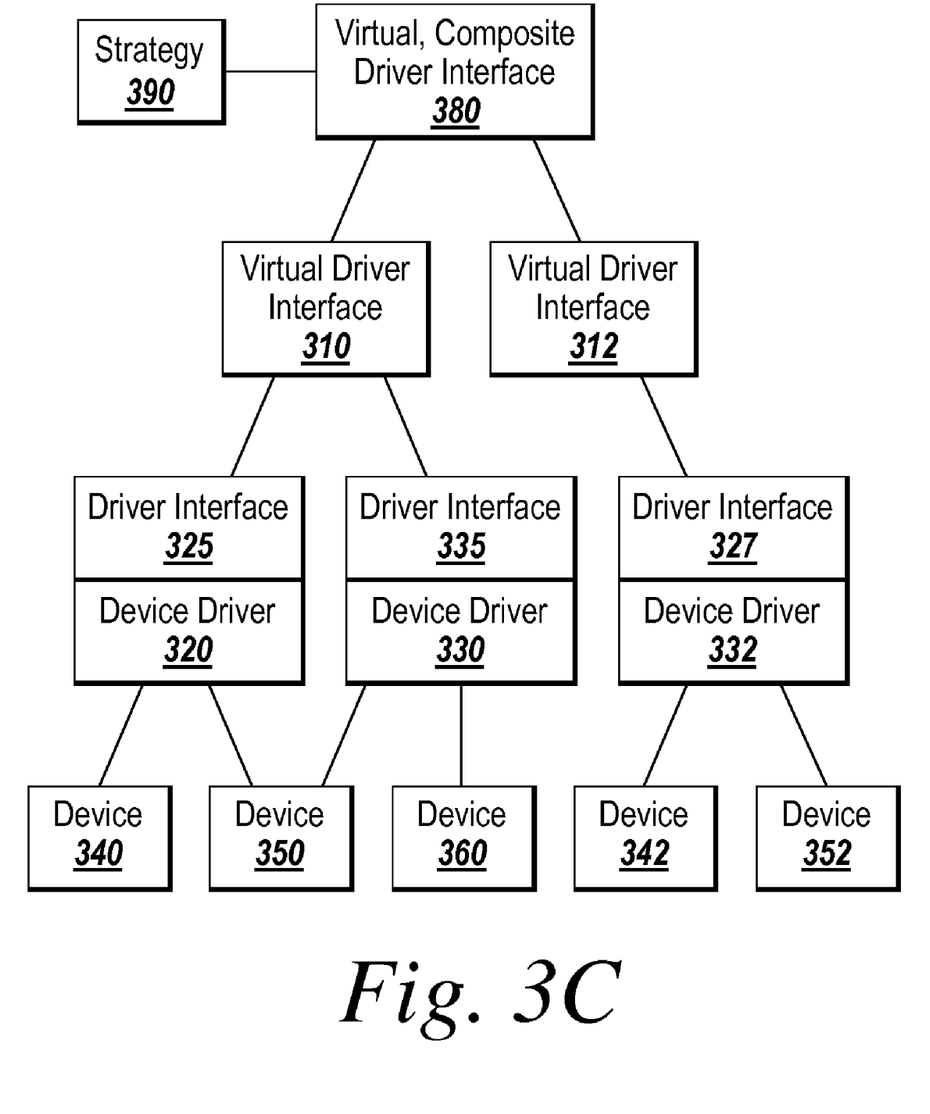
FIG. 3C depicts a graphical representation of another level of abstraction and hierarchy that is consistent with the illustrative embodiment of the present invention.

FIG. 3C depicts a graphical representation of another aspect of the present invention. Again, the lines connecting the items in FIG. 3C are not meant to represent physical connections and are merely shown to provide a sense of hierarchy. The present invention provides for additional levels of abstraction and hierarchy. FIG. 3C includes a virtual, composite driver interface 380 which comprises of two virtual driver interfaces 310 and 312. Driver interfaces 325, 327 and 335 correspond to device drivers 320, 332 and 330, respectively. The virtual, composite driver interface 380 interfaces with virtual driver interfaces 310 and 312. According to the illustrative embodiment of the present invention, the virtual, composite driver interface 380 provides a single interface to an application that allows the application to use a device driver to interact with a device. The virtual, composite driver interface 380 determines which of the device drivers to use for an application based on strategy 390. It will be recognized by one skilled in the art that higher levels of abstraction and hierarchies may be implemented with the present invention.

Each virtual driver interface may include one or more device drivers and/or driver interfaces and each virtual composite, driver interface may include one or more virtual driver interfaces. Further, there may be multiple virtual driver interfaces and/or multiple virtual, composite driver interfaces and multiple strategies, where each virtual driver interface and/or virtual, composite driver interface may have a corresponding strategy.

It will be recognized by one skilled in the art that multiple virtual driver interfaces may use a single strategy. For example, two virtual driver interfaces may exist and each virtual driver interface may group the device drivers according to device type, such that one virtual driver interface groups device drivers by the device type function generators and the other virtual driver interface groups device drivers by the device type oscilloscopes. Both virtual driver interfaces may use the same strategy to determine which device driver to use. The strategy, for example, may be based on the date the driver was created. In this example each virtual driver interface determines which device driver to interface with an application based on the date a device driver was created.

Figure 4:
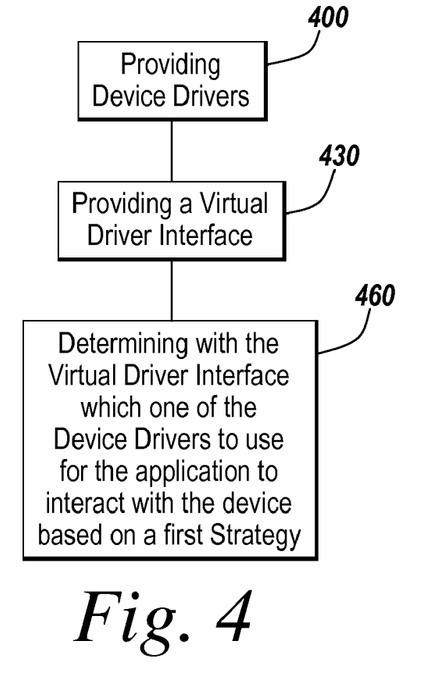
FIG. 4 is the process for implementing the illustrative embodiment of the present invention.

FIG. 4 depicts various steps for implementing the illustrative embodiment of the present invention. A device driver is provided for use with the computing device that allows an application to use a device (Step 400). A virtual driver interface is provided for use with the computing device and allows an application to interface with one or more of the device drivers for a device (Step 430). A first strategy is used for determining with the virtual driver interface which one of the device drivers to use for the application to interact with the device (Step 460). The strategy may be provided with an application and/or the virtual driver interface. Further, additional strategies may be provided to a user at an additional fee from a manufacturer. The additional strategies may incorporate additional features or further device driver optimization strategies.

The strategy may be anything that would allow the virtual driver interface to determine which one of the device drivers to use to allow a selected application to interact with the device. Strategies may be based on a priority list, a look-up table, a date that the driver was created, a selected application program interface (API), a selected version of the device driver, a selected configuration of devices interfaced with the computing device. The strategies discussed throughout this document are not meant to be limiting and are provided as examples of possible strategies that may be implemented with the present invention.

The virtual driver interface and strategy may operate each time the application is started or may operate upon a request from a user. Further, the virtual driver interface and strategy may operate to replace a previously selected device driver while the application is running. In this manner, the virtual driver interface and strategy may determine that a new device driver should be used and replaces a previously selected device driver with the new device driver. One example where the virtual driver interface may replace a previously selected device driver while an application is running is when an application runs continuously for a long period of time. Another example where the virtual driver interface may replace a previously selected device is when a general purpose device driver was previously selected, but during the operation of the application it is determined that a specialized device driver should be used. The virtual driver interface may also replace a specialized driver with a general purpose device driver during the operation of the application.

The virtual driver interface and strategy may operate to select a device driver, a dynamic link library (DLL) or another shared library to use to interact with a selected device for the purpose of determining certain information of the device. For example, the virtual driver interface and strategy may get information relating the version of the device that is connected to the computing device. The virtual driver interface may use this information to implement the strategy, thereby allowing the strategy to select an appropriate device driver, DLL or shared library to use to interact with the device.

Some devices may include FPGA or other programmable hardware that a device driver may download hardware description language to. These devices may be optimized depending on the device driver that is selected. For example a device may be used for high speed communication or low speed communication. The hardware description language necessary to implement low speed communication may require less gates on a FPGA since there may be less protocol associated with the low speed communication as compared to the high speed communication. The illustrative embodiment enables the virtual driver interface and strategy to determine the most appropriate device driver to select based on the operation of the device for an application. For example, an application may be capable of using both high speed communication and low speed communication with a selected device and depending on which speed of communication is being used the application can provide information to the virtual driver interface and strategy so that the virtual driver interface can use the strategy to select the appropriate device driver.

Figure 5A:
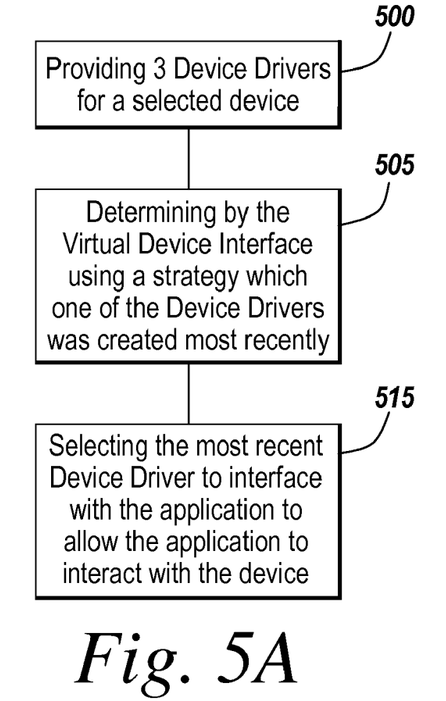
FIG. 5A provides an example of a strategy that is suitable to be implemented with the illustrative embodiment.
Figure 5B:
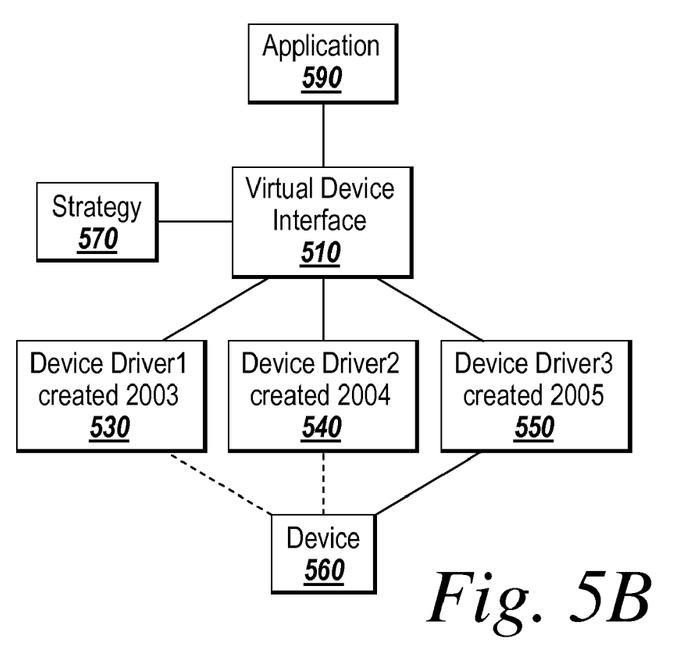
FIG. 5B provides a graphical representation of the strategy implemented in FIG. 5A.
Figure 5C:
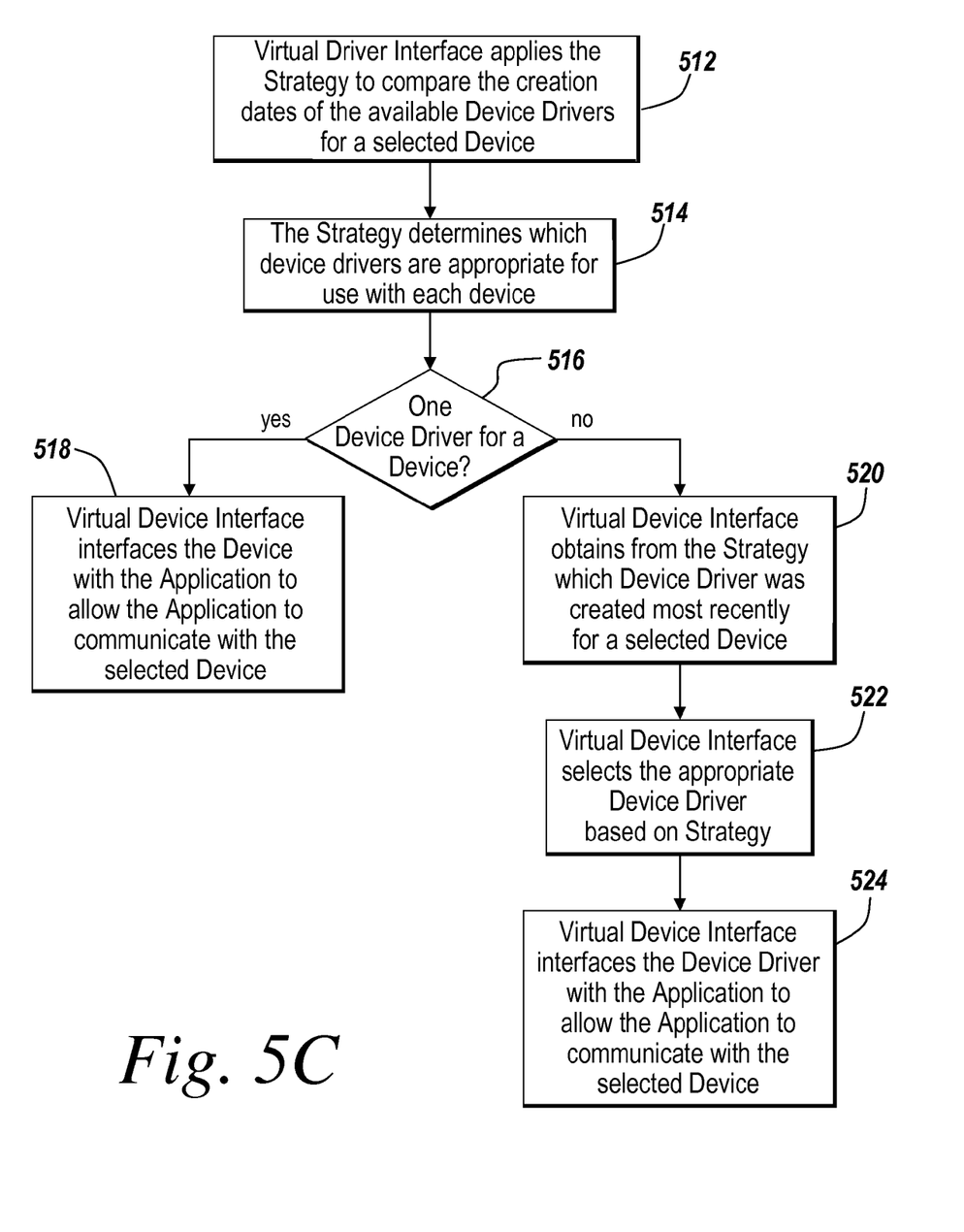
FIG. 5C provides a flow chart of the strategy implemented in FIG. 5A.

Referring to FIGS. 5A-C, strategy 570 may be implemented based on the most recent date a device driver for a selected device was created. FIG. 5A is an illustrative example of the process for implementing a strategy, FIG. 5B provides a graphical representation to be used in conjunction with FIG. 5A and FIG. 5C provides a flowchart of how the strategy is implemented.

In this example there may be three device drivers 530, 540 and 550 suitable for use with the selected device 560. Each device driver, 530, 540 and 550 include the date it was created (Step 500). In this example, device driver 530 was created in 2003, device driver 540 was created in 2004 and device driver 550 was created in 2005. By using the strategy 570, the virtual driver interface 510 determines which one of the device drivers was created most recently (Step 505). The virtual driver interface selects the most recently created device driver, which is device driver 550 in this example, to interface with the application to allow the application to interact with the selected device 560 (Step 515).

The strategy 570 may be a software application or an application program interface (API) that compares the creation date of the applicable drivers. Referring to FIG. 5C, the virtual driver interface applies the strategy 570 to compare the creation dates of the available device drivers for a selected device (Step 512). The virtual driver interface may also apply the strategy 570 to compare the creation date for each device connected to the computing device 100 to determine which device drivers are appropriate for use with each device (Step 514). In the case where there is only one device driver for a selected device (Step 516), the virtual driver interface interfaces the device driver with the application (Step 518). If however, there are multiple device drivers for a single device (Step 516) the virtual driver interface must obtain, by using the strategy 570, which of the device drivers was created most recently (Step 520). The virtual driver interface selects the appropriate device driver, in this case device driver 550, to interface with the application 590 to allow the application 590 to interact with the selected device 560 (Step 522). The virtual driver interface interfaces the device driver with the application to allow the application to communicate with the selected device (Step 524).

Figure 6:
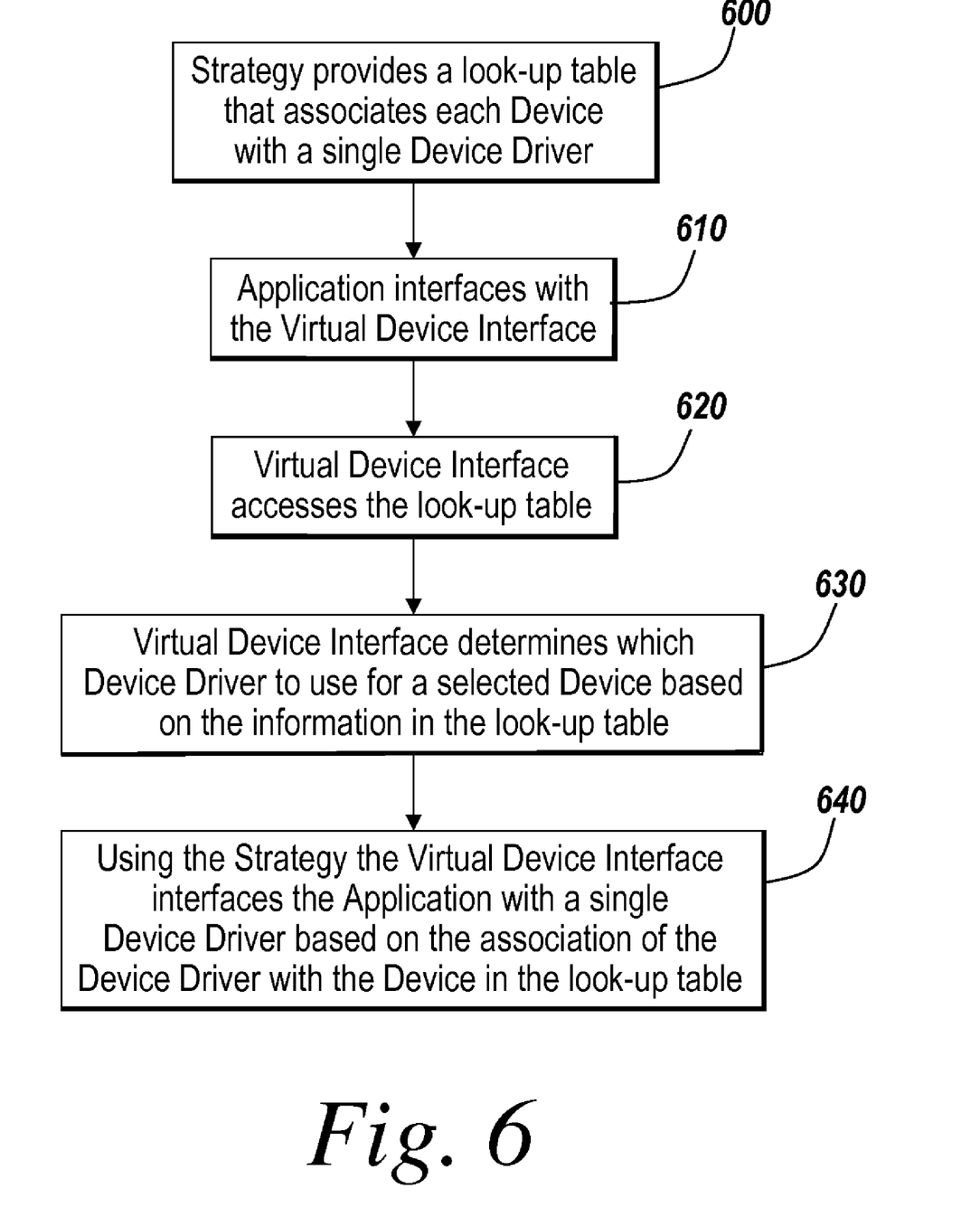
FIG. 6 provide another example of a strategy that is suitable to be implemented with the illustrative embodiment.

In another example, a strategy may be implemented using a look-up table. FIG. 6 depicts a flowchart for implementing a look-up table for the strategy. A look up table may provide a list associating devices with device drivers that are to be used for each device (Step 600). The look-up table provides the virtual driver interface with a list that associates each device with a single device driver despite the availability of multiple device drivers for each device. In this example when an application starts it interfaces with the virtual driver interface (Step 610). The virtual driver interface accesses the look-up table (Step 620), and determines which device driver to use for a selected device based on the information in the look-up table (Step 630). Using this strategy the virtual driver interface interfaces the application with the device driver based on the association of the device driver with the device in the look-up table (Step 640).

Figure 7:
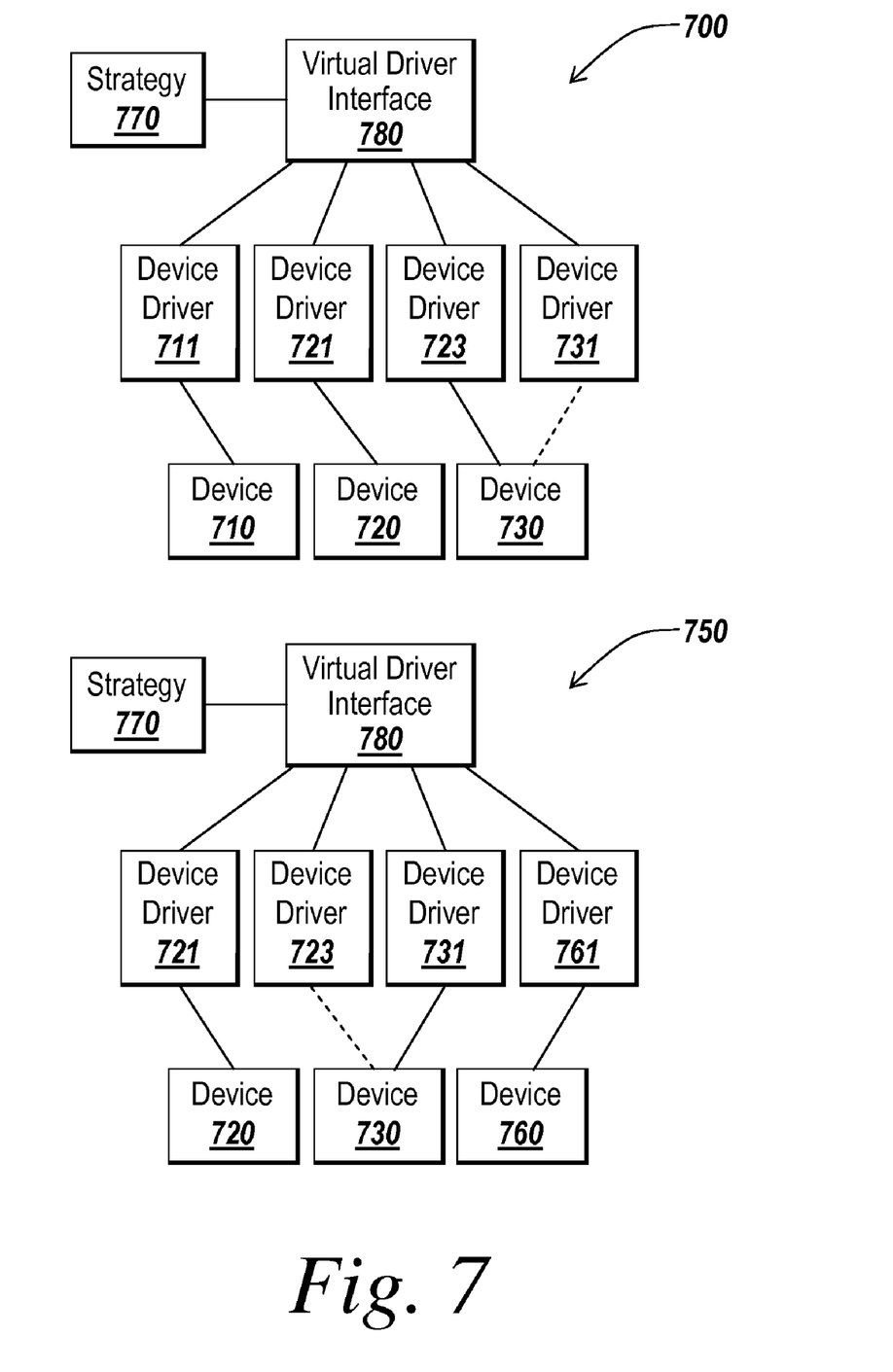
FIG. 7 depicts two graphical representations to illustrate another strategy that is suitable for use with the illustrative embodiment.

In yet another example, a strategy may be implemented based on a selected configuration of devices connected to a computing device. FIG. 7 depicts two graphical representations 700 and 750 each having a different device configuration. Graphical representation 700 shows devices 710, 720 and 730 and device drivers 711, 721, 723 and 731, virtual driver interface 780 and strategy 770. Device 710 is capable of being driven by device driver 711. Device 720 is capable of being driven by device driver 721. Device 730 is capable of being driven by device drivers 723 and 731.

Graphical representation 750 shows devices 720, 730 and 760 and device drivers 721, 723, 731 and 761, virtual driver interface 780 and strategy 770. Device 720 is capable of being driven by device driver 721. Device 730 is capable of being driven by device drivers 723 and 731. Device 760 is capable of being driven by device driver 761. Devices 710 and 760 may be, for example, logic analyzers from the same vendor, where device 710 may represent one model of a logic analyzer offered by the vendor and device 760 may represent another model of a logic analyzer offered by the vendor.

In this example the virtual driver interface 780 chooses the appropriate driver based on which devices are connected to the computing device. In graphical representation 700, the strategy 770 determines which devices are connected to the computing device and using this information determines which of the device drivers to use. The strategy for example may provide when devices 710, 720 and 730 are connected to the computing device, as in graphical representation 700, device driver 723 should be used to allow an application to communicate device 730, but when device 720, 730 and 760 are connected to the computing device, as in graphical representation 750, the virtual driver interface may determine device driver 731 should be used to allow the application to communicate with device 730.

In another embodiment of the present invention, a user may override the determination made by the virtual driver interface when selecting a device driver for a selected device. In this manner the user would be able to select a different device driver then the device driver that has been chosen by the virtual driver interface.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method for interfacing a test and measurement application executing on a computing device with an external device coupled to the computing device, the method comprising
    determining that a first external device is coupled to the computing device;
    determining that a second external device is coupled to the computing device;
    selecting a device driver for use with the first external device from two or more available device drivers that are each compatible with the first external device, wherein the selection is in response to both an identity of the first external device and an identity of the second external device;
    coupling the selected device driver to a virtual driver interface that provides the test and measurement application with a standardized interface to any of the two or more available device drivers; and
    communicating, by the test and measurement application, with the first external device through the virtual driver interface.

2. The method of claim 1 wherein the first external device is a data acquisition device configured to provide data to the test and measurement application.

3. The method of claim 1 wherein the selecting further comprises:
    selecting a particular device driver selection strategy from a plurality of device driver selection strategies; and
    employing the selected device driver selection strategy.

4. The method of claim 3 wherein the particular device driver selection strategy is embodied in a look-up table.

5. The method of claim 1 further comprising:
replacing the selected device driver with a different device driver of the two or more available device drivers, the replacing in response to operation of the test and measurement application.

6. The method of claim 1 wherein the first external device is coupled to the computing device via a general purpose interface bus (GPIB), a virtual machine environment extended for instrumentation (VXI) bus, a VXI-GPIB bus, a Institute of Electrical and Electronics Engineers (IEEE) 1394 bus, or an IEEE 1451 bus.

7. A method for interfacing a test and measurement application executing on a computing device with an external device coupled to the computing device, the external device including a programmable hardware device, the method comprising:
determining a mode of operation for use by the test and measurement application;
in response to the determined mode of operation, selecting a device driver from two or more available devices drivers that are each compatible with the external device;
coupling the selected device driver to a virtual driver interface that provides the test and measurement application with a standardized interface to any of the two or more available device drivers;
programming the programmable hardware device of the external device to operate according to the determined mode of operation;
communicating, by the test and measurement application, with the external device through the virtual driver interface; and
downloading hardware description language to the external device, wherein the programmable hardware device is a field programmable gate array (FPGA).

* * * * *